Patented Dec. 24, 1940

2,226,471

UNITED STATES PATENT OFFICE 2,226,471

PROCESS FOR TREATING MATERIALS WITH CHLORINE

Leslie G. Jenness, Englewood, N. J., assignor to Intermetal Corporation, Newark, N. J., a corporation of Delaware No Drawing. Application March 25, 1938, Serial No. 198,158. Renewed March 4, 1940

5 Claims. (Cl. 23—1)

This invention relates to a process for treating materials with chlorine, and more particularly to such a process and apparatus in which materials are treated with chlorine at relatively high temperatures.

Many chemical processes involving the use of chlorine gas at relatively high temperatures have been suggested. Chlorine is known to be extremely corrosive for metals under high temperature conditions and prior workers have employed retorts or furnaces of refractory materials or have provided metallic structures with refractory linings so as to prevent contact between metals and chlorine at high temperatures. In accordance with the present invention, I have discovered that under certain conditions nickel can be made extremely resistant to corrosion by chlorine at relatively high temperatures such that retorts or furnaces constructed of nickel or having nickel linings can be employed for processes involving the use of chlorine at such relatively high temperatures. More specifically, I have discovered that the presence of sulfur or a sulfur chloride in such processes involving the use of chlorine will cause a protective film to be formed upon the surface of the nickel in contact with the reacting materials such that the nickel metal is not corroded by chlorine at temperatures as high as 575° C.

An object of the present invention is, therefore, to provide an improved process of treating materials with chlorine in which a nickel reaction chamber is employed and sulfur or a sulfur chloride is present in the reacting materials.

Another object of the invention is to provide an improved process for the treatment of materials with chlorine in which a protective film is formed on the surface of a nickel reaction chamber which is in contact with the reacting materials.

As stated above, nickel is known to be rapidly corroded by chlorine. However, by forming the protective film referred to upon the nickel, the nickel may be exposed to chlorine at temperatures up to 575° C. without any measurable corrosion. The film forms readily at very low temperatures and when once formed will not disappear unless the nickel is heated to temperatures above 575° C. The film is black in color and extremely thin, and shows the qualitative presence of sulfur, although it has not thus far been possible to determine the exact composition of the film. The formation of the film apparently requires the presence of a sulfur chloride but is apparently independent of constituents other than sulfur and chlorine.

It is, of course, apparent that it is not necessary to introduce a sulfur chloride into the reaction chamber, as the sulfur chloride may be formed in situ. Free sulfur and many sulfur compounds will react with chlorine to form sulfur chlorides. Thus the presence of free sulfur or such compounds as iron sulfide or other sulfides, found in many ores, provides for the formation of such film.

The film is extremely thin and resistant to abrasion, as furnaces provided with nickel rabble arms scraping ores of relatively abrasive nature over nickel surfaces have been employed for extended periods of time without showing any more than the wear which would be normally expected from such operations in the absence of corrosive gases. When once formed, the film is persistant, as the sulfur or chlorine, or both, can be removed from contact with nickel and the furnace used for other purposes for considerable lengths of time at temperatures below 575° C. without destruction of said film. It is, therefore, entirely possible to intermittently introduce sulfur, sulfur-containing compounds or a sulfur chloride into such a furnace to form said film and thus employ the furnace for continued treatment with chlorine in the absence of sulfur. The present invention has thus far found its chief utility in the chlorination of ores to remove volatile compounds of metal, chlorine and sulfur, as disclosed in Patents Nos. 1,834,622; 1,923,094; 1,858,272 and 1,863,599. A structure of a furnace suitable for carrying out the processes of the above patents is disclosed in the prior application to Leslie G. Jenness, Serial No. 734,566, filed July 11, 1934. Such a furnace includes many moving parts and also the provision of external heating means for supplying heat through the walls of the treating chamber to the materials being treated in order to maintain the necessary or desirable treating temperature. It was, therefore, desirable to construct such a furnace of metal, but no suitable metal was known prior to the present invention which could be commercially used. The film has been formed and maintained in furnace work with titanium, vanadium, tungsten and aluminum bearing ores, indicating that the formation of film is independent of constituents other than the chlorinating gases containing chlorine and a sulfur chloride. It is evident that the present invention is not limited to the treatment of ores but may be employed in any process involving the treatment of materials with chlorine and in which the presence of sulfur is not objectionable.

It has also been found that the film will be formed upon nickel alloys, the major portion of which consists of nickel. Thus nickel alloys can be employed under certain conditions, although the presence of substantial amounts of other metals in the alloy somewhat reduces the temperature of operation. For example, a 90% nickel-10% chromium alloy has been found satisfactory up to a temperature of 525° to 550° C., the film disappearing at only a slightly lower temperature than with pure nickel. It will be seen that I have provided a process and apparatus by which materials can be treated with chlorine at relatively high temperatures in metallic reaction chambers without corrosion, thus providing for treating chambers having high mechanical strength and the efficient application of external heat to the reaction.

While I have disclosed the preferred embodiments of my invention, it is to be understood that the details thereof may be varied within the scope of the following claims.

What I claim is:

1. In a process of treating materials with chlorine, the step which comprises, contacting said materials with chlorine in the presence of a sulfur chloride in apparatus having surfaces in contact with said chlorine of a metal containing a major portion of nickel, said sulfur chloride being present in sufficient amount to maintain a protective film on said metal surfaces.

2. In a process of treating materials with chlorine and sulfur chloride, the step which comprises, contacting said materials with a mixture of chlorine and sulfur chloride in apparatus having inner surfaces of nickel, said sulfur chloride being present in sufficient amount to maintain a protective film on said nickel surfaces.

3. In a process of treating materials with chlorine at a temperature below 575° C. and sufficiently high that said chlorine will attack nickel, the steps which comprise, contacting said materials with chlorine in a reaction chamber having surfaces in contact with said chlorine of a metal containing a major portion of nickel, and employing sufficient sulfur chloride in admixture with said chlorine to maintain a protective film on said surfaces and prevent attack on said metal by said chlorine.

4. In a process of treating materials with chlorine at a temperature below 575° C. and sufficiently high that said chlorine will attack nickel, the steps which comprise, forming a protective film on the interior of a nickel apparatus to prevent attack on said nickel by treating the same with a mixture of chlorine and a sulfur chloride, introducing said materials into said apparatus and contacting the same with said chlorine, said sulfur chloride being employed in sufficient amount to maintain said protective film.

5. In a process of treating materials with chlorine at a temperature below 575° C. and sufficiently high that said chlorine will attack nickel, the steps which comprise, contacting said materials with chlorine in apparatus having nickel inner surfaces in contact with said chlorine, maintaining said temperature by supplying heat to said materials through said surfaces, and employing sufficient sulfur chloride in admixture with said chlorine to maintain the protective film on said surfaces and prevent attack on said nickel by said chlorine.

LESLIE G. JENNESS.